(12) United States Patent
Dougherty et al.

(10) Patent No.: US 6,452,361 B2
(45) Date of Patent: Sep. 17, 2002

(54) BATTERY SYSTEM

(75) Inventors: Thomas J. Dougherty, Waukesha; William P. Segall, Grafton; Michael E. Iverson, Brown Deer, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/912,675

(22) Filed: Jul. 23, 2001

Related U.S. Application Data

(62) Division of application No. 09/204,207, filed on Dec. 2, 1998.
(60) Provisional application No. 60/074,629, filed on Feb. 13, 1998.

(51) Int. Cl.[7] ................................................. H02J 7/00
(52) U.S. Cl. ....................................................... 320/104
(58) Field of Search ................................. 320/104, 103, 320/132, 162; 429/9, 90; 307/43, 66

(56) References Cited

U.S. PATENT DOCUMENTS

| | | | | |
|---|---|---|---|---|
| 5,162,720 A | * | 11/1992 | Lambert | 320/104 |
| 5,525,891 A | * | 6/1996 | Meyer et al. | 320/104 |
| 5,767,658 A | * | 6/1998 | Hayes | 320/104 |
| 6,127,798 A | * | 10/2000 | Lansang et al. | 320/104 |
| 6,177,737 B1 | * | 1/2001 | Palfey et al. | 307/64 |
| 6,222,341 B1 | * | 4/2001 | Dougherty et al. | 320/104 |

* cited by examiner

Primary Examiner—Gregory J. Toatley, Jr.
(74) Attorney, Agent, or Firm—Foley & Lardner

(57) ABSTRACT

A battery system for use in a vehicle is disclosed having a first battery for selectively powering the motor to start the engine, and having a first voltage level and a charge level. The system includes a second battery to operate and maintain the accessory electrical loads, and having a second voltage level. The system includes a charging switch coupling the first battery to the alternator. The system also includes a charge maintenance device coupling the first battery to the second battery to maintain the charge level of the first battery to a predefined magnitude in response to a control signal. The system also includes a controller coupled to both the first battery and the second battery to monitor the first voltage level and the second voltage level, and operating the charging switch and the charge maintenance device in response to the first voltage level and the second voltage level.

54 Claims, 2 Drawing Sheets

BATTERY SYSTEM

CROSS REFERENCE TO RELATED APPLICATIONS

The present application is a division of U.S. patent application Ser. No. 09/204,207, titled "Advanced Battery Controller with State of Charge Control" filed Dec. 2, 1998, which is hereby incorporated by reference. The present application claims the benefit of U.S. Provisional Application Serial No. 60/074,629 filed Feb. 13, 1998, which is hereby incorporated by reference.

FIELD OF THE INVENTION

The present invention relates generally to battery powered electrical systems, such as in motor vehicles; and more particularly to a control system for monitoring and maintaining the charge of the battery while the electrical system is in an inactive state.

BACKGROUND OF THE INVENTION

Automobiles and other combustion engine powered vehicles typically employ an electric motor to start the combustion engine. For that purpose, the electric motor is coupled to a starting circuit which generally receives electrical power from an on-board storage battery. The starting circuit selectively couples electrical energy from the battery to the starting motor that operates to cycle the engine to initiate sustained operation. In common vehicle applications, the battery also provides electrical energy to a variety of electric power consuming devices, such as engine control electronics, lights, and vehicle accessories.

Traditional batteries for these applications, often referred to as starting, lighting and ignition (SLI) batteries, are multi-cell, lead-acid batteries. That is, the batteries are constructed from lead plates pasted with active material and arranged into stacks. Those stacks are inserted into partitioned cell compartments of a battery container, electrically interconnected, and flooded with dilute acid electrolyte. SLI batteries of this construction are more than adequate for providing the relatively high power demand required of engine starting, as well as the relatively low power demand to maintain electrical accessories during both vehicle operation and periods of non-operation. However, because of the seemingly disparate functions the SLI battery is required to perform, short duration high-power output and long duration low-power output, the battery design can not be optimized for performing either of these tasks. An additional drawback of these batteries is relatively low specific energy (kilowatt hour/gram, kWh/g) as compared to other battery constructions owing to the weight of the lead plates and the liquid electrolyte.

There has been suggested a battery system for vehicle use which includes two batteries. A first battery in the system, a starting battery, is optimized to start the engine by being specifically designed for short duration, high-power output. A second battery in the system, a reserve battery, is optimized to operate and maintain non-starting electrical loads, such as for vehicle accessories. An advantage of such a system is that the starting battery may be made smaller and lighter yet capable of providing a high power output for a short period of time. In addition, the reserve battery may be made smaller and lighter yet capable of satisfying the relatively low power requirements of vehicle accessories. In combination, the two batteries may require less space and weigh less than a single traditional SLI battery.

A limitation of a two battery system lies with maintaining the charge of both batteries. Typically, the vehicle includes a voltage/current regulation device which regulates the output of the alternator in response to the charging needs of the SLI battery and the vehicle electrical loads. In the dual battery system, each battery type delivers power and accepts charge at a different r ate. For example, the starting battery delivers power at a very high rate and likewise accepts charge at a high rate. In contrast, the reserve battery delivers power at a lower rate and accepts charge at a lower rate. Moreover, it will typically be the case that each battery will be at a different state-of-charge, hence requiring different charge maintenance. Additional advantages may also be attained by selectively coupling or decoupling the batteries during inactive, starting and operational periods of the vehicle. However, careful management is required so as not to damage either the vehicle electrical system or the dual batteries.

Another problem encountered with battery powered equipment is battery drain during periods of inactivity. For example, a motor vehicle may sit parked for several weeks or months. In that situation a leakage current or current drawn by accessories left turned-on can drain the battery to a point where the remaining charge is insufficient to start the engine. Thus it is desirable to provide a control mechanism that responds to a period of inactivity by disconnecting non-essential loads from the battery.

SUMMARY OF THE INVENTION

The present battery system is particularly adapted for use in a vehicle which has an electric motor for starting an engine, an alternator driven by an engine to generate electricity, and accessory electrical loads The battery system has a first battery for selectively powering the electric motor to start the engine and a second battery to operate and maintain accessory electrical loads. A charge maintenance device connects the first battery to the second battery for the purpose of maintaining the charge of the first battery at a predefined level. A controller monitors the voltage level of the first battery to sense when the battery charge level has decreased to a level at which recharging is needed. At that time the controller operates the charge maintenance device to recharge the first battery from the second battery.

In the preferred embodiment of the battery system a charging switch is provided which selectively connects the first battery to the alternator. The controller activates the charging switch in response to voltage across the second battery.

DETAILED DESCRIPTION OF THE INVENTION

The present invention is described in terms of a preferred embodiment adapted for use in a dual-battery based vehicle electrical system. The batteries in the system provide electrical energy for various vehicle operation functions and receive charging from the vehicle electrical system. It will be appreciated that the scope of the invention is not limited to vehicle applications or dual battery systems. For example, the invention may find application in a single battery system.

In various preferred embodiments of the present invention, battery control electronics, vehicle control electronics and combinations of the these electronic control devices are utilized for battery charge management and enhanced system performance. For example, the system is adaptable to automatically determine charge status of the batteries in the system and to couple, as appropriate, the battery or batteries with sufficient charge to operate essential vehicle electrical loads and to provide energy for starting. In addition, a preferred charge management strategy reduces the potential for over-charging one or more of the system batteries and yet maintains each of the batteries at a ready state-of-charge. The control system also disconnects non-essential loads from the batteries when the battery voltage drops below a defined level during periods of vehicle inactivity. These and other advantages and features of the present invention will be appreciated from the description of the preferred embodiment which follows.

Figure 1:
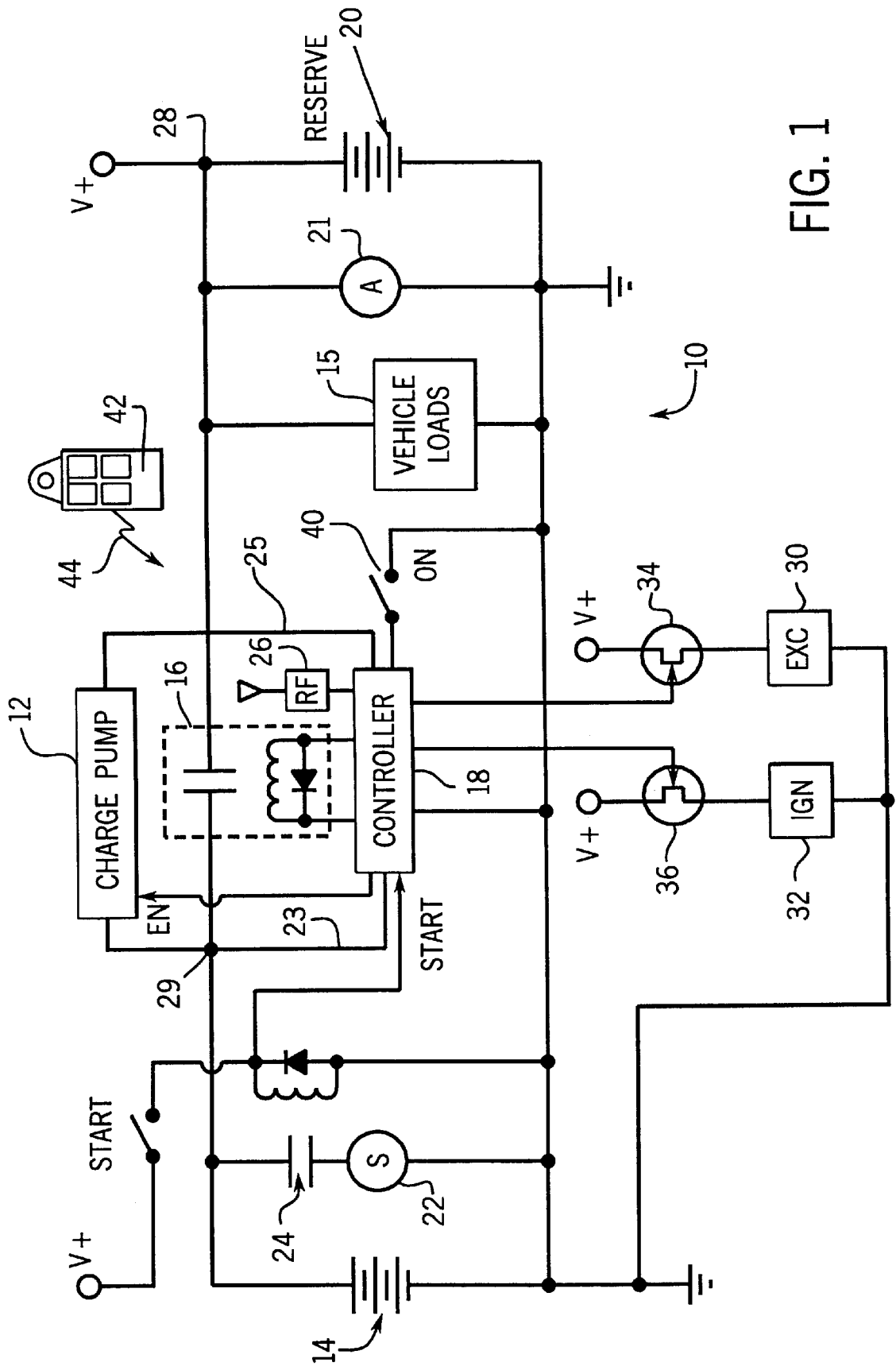
FIG. 1 is a block diagram showing incorporation of the present invention into a dual battery electrical system of a motor vehicle.

Referring to FIG. 1, a vehicle electrical system 10 includes a battery subsystem which has a starting battery 14 coupled for providing electrical energy to engine starting motor 22 through starter relay contacts 24. Starting motor 22 is mechanically coupled to the engine of the vehicle (not shown) for starting the engine as is well known in the art. Starting battery 14 is preferably a high-rate battery, such as the one shown and described in commonly assigned U.S. patent application Ser. No. 08/870,803 entitled: "Modular Electric Storage Battery" filed Jun. 6, 1997, now U.S. Pat. No. 6,265,091, the disclosure of which is hereby expressly incorporated herein by reference.

A reserve battery 20, which is preferably an absorptive glass mat (AGM) type construction with a high reserve capacity, is adapted to provide a relative low-rate discharge for an extended period of time. The reserve battery 20 furnishes power to essential vehicle electrical loads 15.

The electrical system 10 also includes system controller 18 coupled to both starting battery 14 and the reserve battery 20. The controller 18 is a microcomputer with internal memory and input/output ports and executes a control program to perform the functions being described herein. Controller 18 governs the connection of the starting battery 14 and the reserve battery 20 to electrical system 10, and particularly to the essential vehicle loads 15 and other vehicle loads 30, for selectively providing electrical energy during normal vehicle operation and during inactive periods. The essential vehicle loads 15 may comprise such devices as the vehicle engine/power train controller, safety system controller and the like which require power even during periods when the vehicle is not operating. Non-essential vehicle loads 30 may include accessories such as interior lights, entertainment systems, convenience features and the like, which are not required to be powered during inactive periods.

An alternator 21 also is connected to electrical system 10. The alternator is mechanically driven by the engine in a manner that is well known in the art and during periods of vehicle operation generates electrical energy for charging starting battery 14 and reserve battery 20 under the supervision of controller 18. The alternator 21, pursuant to operation of controller 18, also provides electrical energy to vehicle loads 15 and 30, as well as ignition system 32 during normal operation. The output of alternator 21 is controlled through field voltage regulation or other suitable means responsive to the controller 18 or the engine/power train controller (not shown) as is known in the art.

A charging switch, formed by contacts of relay 16, directly couple the starting battery 14 and reserve battery 20.

A charge maintenance device 12, also referred to as a "charge pump", is connected in parallel with the relay contacts. The charge maintenance device 12 under control of controller 18 couples energy from the reserve battery 20 to the starting battery 14 to maintain the charge status of starting battery. For example, energy may be channeled to the starting battery 14 during periods when the vehicle is not being used or during periods of operation where the starting battery requires additional charge. Since a relatively small power draw from reserve battery 20 may be used to maintain starting battery 14 at a substantially full state-of-charge without adversely effecting the charge status of reserve battery 20, the self-discharge characteristic of starting battery 14 may be overcome.

Figure 2:
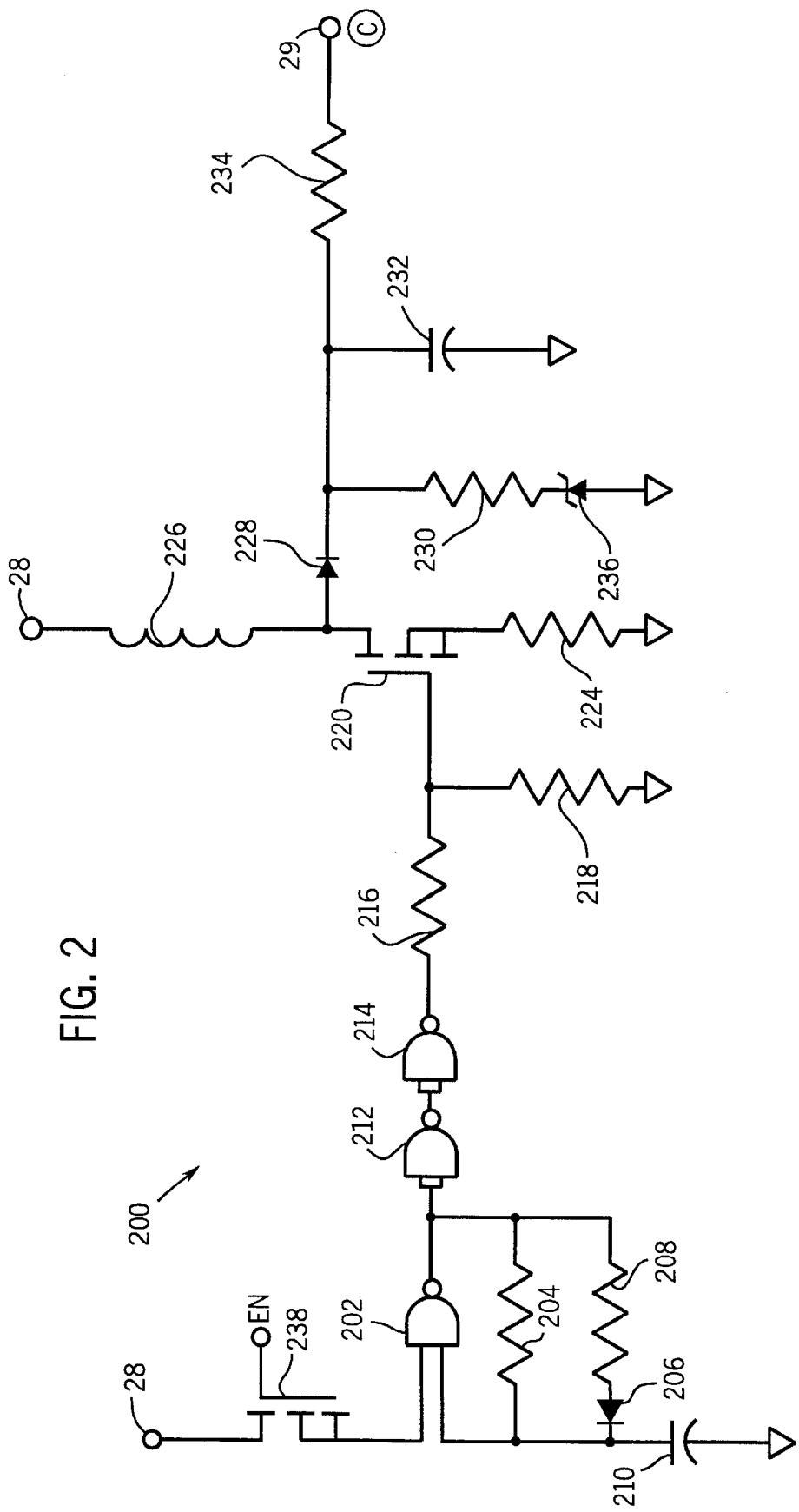
FIG. 2 is a block schematic diagram of the circuitry for the charge maintenance device shown in FIG. 1.

FIG. 2 illustrates a preferred embodiment of charge maintenance device 12 having a circuit 200 which provides milliampere current pulses from reserve battery 20 to starting battery 14. The circuit 200 includes NAND gates 202, 212 and 214 which are operatively coupled to form a pulse generator, specifically the reserve battery 20 is coupled a first input of NAND gate 202 through transistor switch 238 which is operated by the enable signal (EN) from the controller 18. A second input is coupled to output of NAND gate 202 by resistor 204. A series combination of resistor 208 and diode 206 is coupled in parallel with resistor 204 and capacitor 210 couples the second input to circuit ground. The connection of components forms a square wave oscillator. That is, when switch 236 is closed, NAND gate 202 produces a periodic pulse train. The precise frequency of the pulse train is not critical to operation of circuit 200, but is preferably set at about 5–30 kilohertz (kHz).

The pulse train is buffered and amplified through NAND gates 212 and 214 and coupled via a resistor network, including resistors 216 and 218, to the gate of transistor 220. In the preferred embodiment, transistor 220 is a field effect transistor (FET), but it should be understood that any suitable switching device may be used without departing from the fair scope of the invention. The application of the pulse train alternately turns on and off transistor 220.

When transistor 220 is conductive, current flows from the positive terminal 28 of reserve battery 20 through inductor 226, transistor 220 and resistor 224. This causes voltage to build up across the inductor 226. In the non-conductive state of transistor 220, the voltage built up across inductor 226 is discharged through a current limiting resistor 234 into the starting battery 14, thereby providing a charge maintenance current. Diode 228 prevents reverse current flow, and resistor 230 and Zener diode 236 provide a voltage dumping path which protects transistor 220 from excessive voltage. Zener diode 236 preferably has a 15–16 volt reverse breakdown level thereby clamping the voltage across inductor 226 at that level. Construction and operation of the charge maintenance device 12 is described in greater detail in commonly assigned U.S. patent application Ser. No. 08/1932,950 entitled "Battery Charge Maintenance System and Method" filed Sep. 17, 1997 by a co-inventor of the present invention, now U.S. Pat. No. 6,222,341, and the disclosure of which is hereby expressly incorporated herein by reference.

When the alternator is not producing electricity, the controller 18 acts to open and close switch 238 for activating and deactivating the charge maintenance circuit 200 to maintain the starting battery at a given charge level. However, it is possible to allow circuit 200 to operate continuously without adverse affect to either starting battery 14 or reserve battery 20. Nevertheless, to maximize the standby capability of the system the preferred embodiment of circuit 200 is activated when starting battery 14 voltage falls below a predefined threshold, as will be described subsequently. For example, the controller 18 senses starting battery 14 voltage and when it falls below approximately 12.75 volts to close switch 238 activate the charge maintenance device 12.

Once activated, controller 18 initiates a timer, and the charge maintenance device 12 is allowed to operate for 6 to 24 hours depending capacity of the starting battery 14 and the ability of circuit 200 to provide charge current to starting battery 14. At the conclusion of the time period, switch 238 is opened deactivating charge maintenance device 12. Controller 18 also can be adapted to sense when starting battery voltage exceeds a threshold value for deactivating the charge maintenance device 12, or the controller may continuously activate device 12 in response to various operating conditions, for example, environmental conditions such as extreme ambient cold.

Referring again to FIG. 1, during normal starting of the motor vehicle engine when the batteries 14 and 20 are properly charged, charging relay 16 is de-energized so that the starter motor 22 is powered only by the starting battery 14 when the starter relay contacts 24 close. At this time, the controller 18 monitors the voltage across each battery 14 and 20 via connections provided by conductors 23 and 25, respectively, to the positive terminals of the batteries. If the controller 18 senses that the voltage from the reserve battery 20 is below a given level during starting, the controller energizes charging relay 16 so that the starting battery 14 will be connected to supply power to those other car loads 15. In this normal condition, other car loads 15 are powered by the reserve battery 20.

Once the engine starts, if the voltage provided to the car loads 15 (i.e. the voltage at terminal 28) is 13.6 volts or more, the controller 18 energizes charging relay 16 so that the starting battery 14 is charged by voltage from alternator 21. However, when the voltage provided to the car loads 15 drops to 13.1 volts or less, the charging relay 16 is de-energized so that its contacts open terminating charging of the starting battery 14.

The controller 18 also provides protection against the batteries becoming excessively drained during periods when the motor vehicle is inactive. To this end, the non-essential accessory vehicle loads 30 are connected to the positive terminal 28 of the reserve battery 20 through a first MOSFET transistor 34, and the ignition circuit 32 is coupled to that positive terminal 28 through a second MOSFET transistor 36. The gate electrodes of first and second MOSFET transistors 34 and 36 are connected to and operated by separate outputs of controller 18, thereby acting as power switches which govern application of electricity to the accessory vehicle loads 30 and the ignition circuit 32.

When the driver parks the motor vehicle, the controller 18 detects that the ignition switch 40 has been turned off and responds by activating an internal timer. After a predefined period of time (e.g. two minutes) elapses, the controller 18 begins periodically measuring the voltage provided by the reserve battery 20. Should that voltage drop below 12.2 volts the controller 18 turns off the first MOSFET transistor 34 thereby disconnecting power from being applied yo non-essential accessory loads 30. This stops further power consumption by such loads, as a dashboard clock, which otherwise would drain the reserve battery further. This disconnection conserves the remaining battery charge.

Upon exiting the vehicle, the driver may press a button of a key fob 42 of a type used in keyless entry systems. That action causes the fob 42 to transmit a radio frequency (RF) signal 44 to a receiver 26 in the vehicle to indicate that the security system for the vehicle should be armed. In response, the RF receiver 26 sends a security system armed signal to the controller 18, which responds by turning off the second MOSFET transistor 36 disconnecting application of electrical power to the ignition circuit 32. This action prevents a car thief from being able to start the car, even if the thief is able to operate the ignition switch 40.

Upon returning to the vehicle, the driver presses another button of the key fob 42 which transmits a radio frequency (RF) signal indicating that the security system should be disarmed. The receipt of this second RF signal is communicated by the receiver 26 to the controller 18 which responds by turning on both first and second MOSFET transistors 34 and 36, thereby powering non-essential accessory loads 30 and the ignition circuit 32. Preferably, these loads and circuit remain activated for a predefined time interval (e.g. two to five minutes) as determined by a timer within the controller 18. If this time period elapses without the engine starting, the first and second MOSFET transistors 34 and 36 are turned off until the key fob is activated again by the driver. As a back-up, a manual switch may be provided on the fuse block or elsewhere in the car to enable the controller 18 to reactivate the car circuits in the event that the key fob is lost or inoperative.

The present invention has been described with reference to specific voltage levels and time periods. A skilled artisan will appreciate that these values are a function of the particular battery powered circuit to which the invention is being applied and by no means are they the only voltage levels and time periods which can be employed.

We claim:

1. A battery system for use in a vehicle having an electric motor for starting an engine, an alternator driven by the engine to generate electricity, and accessory electrical loads comprising:

a first battery for selectively powering the motor to start the engine, and having a first voltage level and a charge level;

a second battery to operate and maintain the accessory electrical loads, and having a second voltage level;

a charging switch connecting the first battery to the alternator;

a charge maintenance device connecting the first battery to the second battery to maintain the charge level of the first battery to a predefined magnitude in response to a control signal;

a controller coupled to both the first battery and the second battery to monitor the first voltage level and the second voltage level, and operating the charging switch and the charge maintenance device in response to the first voltage level and the second voltage level.

2. The battery system of claim 1 wherein the controller produces the control signal thereby activating the charge maintenance device when the first battery requires charging while the alternator is not substantially generating electricity.

3. The battery system of claim 1 wherein the controller closes the charging switch in response to the second charge level being greater than a first threshold, and opens the charging switch in response to the second charge level being less than a second threshold.

4. The battery system of claim 3 wherein the second threshold is less than the first threshold.

5. The battery system of claim 1 further comprising a power switch which connects the accessory electrical loads to the first battery and which is connected to the controller, wherein the controller operates the power switch in response to the second charge level.

6. The battery system of claim 1 further comprising a power switch which connects the accessory electrical loads to the first battery and which is connected to the controller, wherein the controller operates the power switch to disconnect accessory electrical loads when the second charge level is below a given threshold.

7. The battery system of claim 1 wherein the charge maintenance device responds to the control signal by applying a series of current pulses to recharge the first battery.

8. The battery system of claim 1 wherein the charge maintenance device comprises a charge pump.

9. The battery system of claim 1 further comprising a receiver for sending a signal to the controller to disengage the power switch.

10. A battery system for use in a vehicle having an electric motor for starting an engine, an alternator driven by the engine to generate electricity, and accessory electrical loads comprising:
   a first battery for selectively powering the electric motor to start the engine, and having a first charge level;
   a second battery to operate and maintain the accessory electrical loads, and having a second charge level;
   means for maintaining a charge of the first battery at a predefined level;
   means for operating the means for maintaining a charge of the first battery at the predefined level in response to the first charge level.

11. The battery system of claim 10 wherein the means for maintaining a charge of the first battery at the predefined level connects the first battery to the second battery.

12. The battery system of claim 11 wherein the means for maintaining the charge of the first battery at the predefined level comprises a charge maintenance device.

13. The battery system of claim 12 wherein the means for maintaining a charge comprises a controller coupled to the first battery.

14. The battery system of claim 13 wherein the controller is configured to enable the charge maintenance device in response to the first charge level being less than a first threshold, and is configured to disable the charge maintenance device in response to the first charge level being greater than a second threshold greater than the first threshold.

15. A battery system for use in a vehicle having a motor for starting an engine, an alternator driven by the engine to generate electricity, and accessory electrical loads comprising:
   a first battery for selectively powering the motor to start the engine, and having a first charge level;
   a second battery to operate and maintain the accessory electrical loads, and having a second charge level;
   a charge maintenance system configured to maintain a charge of the first battery at a predefined level; and
   a controller coupled to the first battery to monitor the first charge level, and operating the charge maintenance system in response to the first charge level.

16. The battery system of claim 15 wherein the charge maintenance system couples the first battery to the second battery.

17. The battery system of claim 15 wherein the second battery includes a glass mat.

18. The battery system of claim 16 wherein the second battery has a relatively high reserve capacity and is adapted to provide a relatively low-rate discharge for an extended period.

19. The battery system of claim 16 wherein the controller is configured to activate the charge maintenance system when the first battery requires charging while the alternator is not substantially generating electricity.

20. The battery system of claim 16 further comprising a charging switch coupling the first battery to the alternator and being coupled to the controller.

21. The battery system of claim 20 wherein the controller is configured to operate the charging switch in response to voltage across the second battery.

22. The battery system of claim 21 wherein the controller is configured to close the charging switch in response to the voltage across the second battery being greater than a first threshold, and configured to open the charging switch in response to the voltage across the second battery being less than a second threshold.

23. The battery system of claim 22 wherein the second threshold is less than the first threshold.

24. The battery system of claim 16 further comprising a power switch which couples the accessory electrical loads to one of the first battery and the second battery, and which is coupled to the controller.

25. The battery system of claim 24 wherein the controller is configured to operate the power switch in response to voltage across the second battery.

26. The battery system of claim 25 further comprising a power switch which couples the accessory electrical loads to the first battery, and which is coupled to the controller.

27. The battery system of claim 26 wherein the controller is configured to operate the power switch to disconnect the accessory electrical loads when voltage across the second battery is below a given threshold.

28. The battery system of claim 16 wherein the charge maintenance system is configured to respond to a control signal from the controller by applying a series of current pulses to recharge the first battery.

29. The battery system of claim 16 wherein the charge maintenance system comprises a charge pump.

30. The battery system of claim 16 further comprising a charging switch in a first circuit path between the first battery and the second battery and the alternator, the charging switch coupling the first battery to the second battery and the alternator.

31. The battery system of claim 16 wherein the controller is coupled to the second battery to monitor the second charge level.

32. The battery system of claim 31 wherein the controller is configured to enable and disable the charge pump in response to the first charge level.

33. The battery system of claim 32 wherein the controller is configured to open and close the charging switch in response to the second charge level.

34. The battery system of claim 16 wherein the controller is configured to enable the charge pump in response to the first charge level being less than a first threshold, and configured to disable the charge pump in response to the first charge level being greater than a second threshold greater than the first threshold.

35. A charge management system for a vehicle comprising:
   a first battery having a first charge for powering a vehicle ignition system;
   a second battery having a second charge for powering at least one electrical accessory;
   a charge maintenance system coupled to the first battery and the second battery and configured to: (a) monitor at least one of the first charge of the first battery and the second charge of the second battery; (b) maintain the first charge of the first battery at a predetermined value by selectively coupling the first battery to the second battery; and (c) disconnect the second battery from the accessory when the second charge of the second battery is at a predetermined value.

36. The charge management system of claim 34 wherein the charge maintenance system couples the first battery to the second battery until the first charge of the first battery reaches a predetermined value.

37. The charge management system of claim 36 wherein the predetermined value of the first charge of the first battery is greater than about 13V.

38. The charge management system of claim 36 wherein the charge maintenance system couples the first battery to the second battery for a predetermined time.

39. The charge management system of claim 38 wherein the predetermined time for coupling the first battery to the second battery is less than about 24 hours.

40. The charge management system of claim 36 wherein the charge maintenance system disconnects the second battery from the accessory when the second charge of the second battery is less than about 12.2V.

41. The charge management system of claim 36 wherein the charge maintenance system comprises a transistor for disconnecting the accessory from the second battery.

42. The charge management system of claim 41 wherein the charge maintenance system comprises a MOSFET for disconnecting the accessory from the second battery.

43. The charge management system of claim 36 wherein the charge maintenance system disconnects the accessory from the first battery when first charge is less than a predetermined value.

44. The charge management system of claim 36 wherein the first battery is a starting battery and the second battery is a reserve battery.

45. The charge management system of claim 44 wherein the second battery is an absorptive glass mat battery.

46. The charge management system of claim 44 wherein at least one of the first battery and the second battery is a capacitor.

47. The charge management system of claim 44 wherein the charge maintenance system comprises a control system.

48. The charge management system of claim 47 wherein the charge maintenance system further comprises a controller.

49. The charge management system of claim 48 wherein the charge maintenance system further comprises a computer for executing a control program.

50. The charge management system of claim 48 wherein the charge maintenance system is under the control of the control program.

51. The charge management system of claim 50 wherein the charge maintenance system comprises a charge pump.

52. The charge management system of claim 50 wherein the charge maintenance system comprises a charge maintenance device.

53. The charge management system of claim 50 wherein the accessory comprises an interior light.

54. The charge management system of claim 53 further comprising an input device for selectively disconnecting and reconnecting the first battery with the ignition system.

* * * * *